United States Patent Office 3,649,679
Patented Mar. 14, 1972

3,649,679
SUBSTITUTED PHENYLALKANOIC ACID
DERIVATIVES II
Winston S. Marshall, Indianapolis, Ind., assignor to Eli
Lilly and Company, Indianapolis, Ind.
No Drawing. Filed Aug. 15, 1968, Ser. No. 752,800
Int. Cl. C07c 65/14, 149/40
U.S. Cl. 260—520                                     5 Claims

ABSTRACT OF THE DISCLOSURE

Novel derivatives of 2-(4-phenoxyphenyl or 4-phenylthiophenyl)alkanoic acids having anti-inflammatory, analgesic, and anti-pyretic activity.

---

This invention relates to novel derivatives of 2-(4-phenoxyphenyl)acetic acid and 2-(4-phenylthiophenyl)acetic acid, having anti-inflammatory, analgesic, and anti-pyretic activity, to novel anti-inflammatory compositions containing such derivatives, and to methods for treating inflammation, fever, and pain in mammals.

2-(4-phenoxyphenyl)acetic acid and its α-methyl homolog, 2-(4-phenoxyphenyl)propionic acid, have been reported as anti-inflammatory agents, Great Britain No. 13,606/62. It has now been found that a number of derivatives of 2-(4-phenoxyphenyl or phenylthiophenyl) acetic acids surprisingly exhibit better anti-inflammatory activity than do the unsubstituted compounds.

Therefore, it is a primary object of this invention to provide novel derivatives of 2-(4-phenoxyphenyl and phenylthiophenyl)acetic and propionic acids having improved anti-inflammatory activity. It is a further object of this invention to provide therapeutic compositions for the relief of inflammation, pain, and fever in mammals. Still a further object is to provide methods for treating inflammation, fever, and pain in mammals. Further objects will become apparent to those skilled in the art from the following description and claims.

The compounds of this invention have the formula

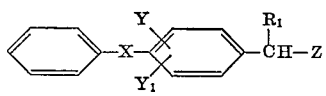

wherein
X is oxygen or sulfur;
Y is hydrogen, hydroxy, halo (chloro, fluoro, bromo, iodo), amino, nitro, $C_1$–$C_5$ alkyl, $C_1$–$C_3$ alkoxy, phenoxy, methanesulfonyl, methanesulfonamido, trifluoromethyl, acetamido, or methylmercapto;
$Y_1$ is hydrogen, hydroxy, halo (chloro, fluoro, bromo, iodo), $C_1$–$C_5$ alkyl, or $C_1$–$C_3$ alkoxy;
$R_1$ is hydrogen, hydroxy, $C_1$–$C_5$ alkyl, $C_2$–$C_5$ alkenyl, $C_2$–$C_5$ alkynyl, or $C_3$–$C_7$ cycloalkyl, except that both Y and $Y_1$ cannot be hydrogen when $R_1$ is hydrogen or methyl; and
Z is either:
(a) —$COOR_2$, $R_2$ being hydrogen, $C_1$–$C_5$ alkyl, di-($C_1$–$C_3$ alkyl)amino($C_1$–$C_4$)alkyl, or an alkali metal, alkaline earth metal, ammonium, or substituted ammonium cation;

(b)
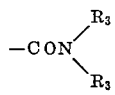

wherein each $R_3$ is the same or a different member of the group consisting of hydrogen, hydroxy, $C_1$–$C_5$ alkyl, cyclopropylmethyl, or —$CH_2$—$COOR_2$;

(c) —$CH_2OR_4$, $R_4$ being hydrogen, $C_1$–$C_5$ alkyl, acetyl, propionyl, carbamyl, N-methylcarbamyl, N,N-dimethylcarbamyl, or $C_3$–$C_6$ alkoxyalkyl; or (d)
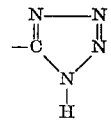

"Alkyl metal," as used herein, refers to sodium and potassium.
"Alkaline earth metal" refers to calcium and magnesium.
"Halo" includes chloro, fluoro, bromo, and iodo.
"Substituted ammonium" includes methyl ammonium, diethyl ammonium, benzyl ammonium, triethanolammonium, and the like.
"$C_1$–$C_5$ alkyl" refers to both straight and branched chain alkyls including methyl, ethyl, n-propyl, isopropyl, n-butyl, sec-butyl, tert-butyl, isobutyl, n-amyl, isoamyl, neopentyl, and the like.
"$C_2$–$C_5$ alkenyl" refers to the $C_2$–$C_5$ alkyl groups, as defined above, from which a hydrogen atom has been removed from each of two adjacent carbon atoms to produce ethylenic unsaturation; e.g., vinyl, allyl, methallyl, 1-pentenyl, and the like.
"$C_2$–$C_5$ alkynyl" refers to the groups as defined above, from which two hydrogen atoms have been removed from each of the two adjacent carbon atoms to produce acetylenic unsaturation; e.g., ethynyl, propargyl, 2-butynyl, 1-pentynyl, 3-hexynyl, and the like.
"$C_3$–$C_7$ cycloalkyl" includes cyclopropyl, cyclobutyl, cyclopentyl, cyclohexyl, and cycloheptyl.
"$C_1$–$C_3$ alkoxy" refers to methoxy, ethoxy, and propoxy.
Compounds represented by the above formula are excellent anti-inflammatory agents, many of them having an $ED_{50}$ of from 0.5 to 1 mg./kg. in mammals. In addition to their anti-inflammatory activity, the compounds exhibit aspirin-like analgesic and anti-pyretic activity. Therapeutic compositions comprising as their active ingredient(s) one or more compounds of the above formula in association with a pharmaceutically acceptable diluent or carrier are also provided by this invention.

Illustrative compounds of the present invention are as follows:

2-(2,3-dimethyl-4-phenoxyphenyl)propionic acid
2-(3,5-dimethyl-4-phenoxyphenyl)propionic acid, sodium salt
2-(2-iodo-4-phenylthiophenyl)acetic acid
2-(3-methoxy-4-phenoxyphenyl)propionic acid
2-(3-methoxy-4-phenoxyphenyl)acetic acid
2-cyclohexyl-2-(2-isopropyl-4-phenoxyphenyl)acetic acid
2-(2-methoxy-4-phenoxyphenyl)acetic acid
2-(2-methoxy-4-phenylthiophenyl)propionic acid
t-Butyl-2-(2-methyl-4-phenoxyphenyl)propionate
2-(3-methyl-4-phenoxyphenyl)acetic acid
Ethyl 2-(3-bromo-4-phenoxyphenyl)propionate
2-(3-methyl-4-phenoxyphenyl)propionic acid
2-(2,3-dimethyl-4-phenoxyphenyl)acetic acid
2-vinyl-2-(3-chloro-4-phenoxyphenyl)acetic acid
2-(2,3-dimethyl-4-phenoxyphenyl)propionic acid
2-(2-ethyl-4-phenylthiophenyl)acetic acid
Methyl 2-(3-t-butyl-4-phenoxyphenyl)acetate
2-(3-hydroxy-4-phenoxyphenyl)acetic acid, benzylammonium salt
2-cyclopropyl-2-(2-fluoro-4-phenylthiophenyl)acetic acid
2-(3,5-dimethyl-4-phenoxyphenyl)acetic acid
2-(3-methylmercapto-4-phenoxyphenyl)valeric acid
2-(2,5-dimethoxy-4-phenoxyphenyl)acetic acid 2-(2,4-diphenoxyphenyl)acetic acid
2-(3-methanesulfonyl-4-phenoxyphenyl)acetic acid
2-(3,4-diphenoxyphenyl)acetic acid
2-(2-fluoro-4-phenylthiophenyl)acetic acid
2-(2-fluoro-4-phenoxyphenyl)propionic acid
Methyl 2-(2-fluoro-4-phenoxyphenyl)propionate
Ethyl 2-(3-trifluoromethyl-4-phenoxyphenyl)acetate
Ethyl 2-(2-acetamido-4-phenoxyphenyl)propionate
2-(diethylamino)ethyl 2-(4-phenoxyphenyl)propionate
2-(3-methyl-4-phenoxyphenyl)propionamide
2-(2-chloro-4-phenoxyphenyl)propionamide
N-methyl-2-(2-fluoro-4-phenoxyphenyl)propionamide
N-methyl-2-(3-methoxy-4-phenoxyphenyl)propylcarbamate
N,N-dimethyl-2-(3-ethyl 4-phenoxyphenyl)propionamide
N,N-dimethyl-2-(2,5-dichloro-4-phenoxyphenyl)-n-pentyl carbamate
N-cyclopropylmethyl-2-(3-methyl-4-phenoxyphenyl)-propionamide
2-ethynyl-2-(3-nitro-5-methanesulfonyl-4-phenoxyphenyl)acetic acid
2-(2-propoxy-4-phenylthiophenyl)propanol
Methyl 2-(2-amino-4-phenylthiophenyl)propionate
Ethyl 2-(3-nitro-4-phenylthiophenyl)propionate
2-diethylaminoethyl 2-(2-iodo-4-phenylthiophenyl)propionate
2-(3-methanesulfonyl-4-phenylthiophenyl)propyl 2-(3-chloro-4-phenylthiophenyl)acetate
2-(2-methylmercapto-4-phenylthiophenyl)propionamide
2-(3-bromo-4-phenylthiophenyl)acetamide
2-(3-chloro-4-phenylthiophenyl)butyramide
N-methyl-2-(3-phenoxy-4-phenylthiophenyl)propionamide
N,N-dimethyl-2-(2-chloro-4-phenylthiophenyl)propropionamide
N-cyclopropylmethyl-2-(2-fluoro-4-phenylthiophenyl)propionamide The compounds of this invention can be prepared by methods which are well known for the preparation of phenylacetic and phenylpropionic acid derivatives. Generally, the compounds of this invention can be obtained by the well-known Willgerodt reaction, that is, by reacting the corresponding phenoxyacetophenone with sulfur and morpholine followed by hydrolysis of the intermediate thioamide with an acid or base. The phenoxyacetophenones are generally obtained from the Ullman diarylether synthesis as described by Bacon and Steward, J. Chem. Soc., 4953 (1965). The salts of the alkanoic acids of this invention are prepared by methods well known in the art.

The following examples further illustrate this invention.

EXAMPLE 1

Preparation of 2-(3-methoxy-4-phenoxyphenyl) acetic acid

To 17 ml. of morpholine were aded 29.2 g. of 3-methoxy-4-phenoxyacetophenone and 5.75 g. of sulfur. The reaction mixture was refluxed gently with stirring for 20 hours. The reaction mixture was diluted to 300 ml. with 15 percent potassium hydroxide and 100 ml. ethyl alcohol, and refluxed with stirring overnight. The reaction mixture was then poured into ice water and acidified with 6 N HCl, whereupon a gummy precipitate, which partially crystallized, formed. The precipitate was filtered, washed with water, and dried in vacuo. The dried precipitate was taken up in hexane with ethyl acetate, decolorized while boiling, filtered and cooled to yield 18.4 g. of dense, yellow-orange crystals of 2-(3-methoxy-4-phenoxyphenyl) acetic acid. M.P. 83–85° C., pK′a=6.8.

Analysis.—Calcd. for $C_{15}H_{14}O_4$ (percent): C, 69.75; H, 5.46. Found (percent): C, 69.72; H, 5.45.

EXAMPLES 2–8

The following compounds were prepared by the method of Example 1, from the corresponding phenoxyacetophenone, using appropriate amounts of sulfur and morpholine:

2-(2-methyl-4-phenoxyphenyl)acetic acid, M.P. 71.5–74° C., pK′a=6.9.

Analysis.—Calc. for $C_{15}H_{14}O_3$ (percent): C, 74.36; H, 5.83. Found (percent): C, 74.43; H, 5.79.

2-(3,5-dimethyl-4-phenoxyphenyl)acetic acid, M.P. 124–126° C., pK′a=7.45.

Analysis.—Calc. for $C_{16}H_{16}O_3$ (percent): C, 74.98; H, 6.29. Found (percent): C, 74.30; H, 6.27.

2-(3-methyl-4-phenoxyphenyl)acetic acid, M.P. 89–91° C., pK′a=7.1.

Analysis.—Calc. for $C_{15}H_{14}O_3$ (percent): C, 74.36; H, 5.83. Found (percent): C, 74.49; H, 5.72.

2-(2,3-dimethyl-4-phenoxyphenyl)acetic acid, M.P. 106–108° C., pK′a=7.1.

Analysis.—Calc. for $C_{16}H_{16}O_3$ (percent): C, 74.98; H, 6.29. Found (percent): C, 74.95; H, 6.00.

2-(2-ethyl-4-phenoxyphenyl)acetic acid, M.P. 82–84° C., pK′a=7.0.

Analysis.—Calc. for $C_{16}H_{16}O_3$ (percent): C, 74.98; H, 6.29. Found (percent): C, 75.20; H, 6.55.

2-(2-phenoxy-4-phenoxyphenyl)acetic acid, M.P., 125–127° C., pK′a=7.0.

Analysis.—Calc. for $C_{20}H_{16}O_4$ (percent): C, 74.99; H, 5.03. Found (percent): C, 74.84; H, 4.92.

2-(2-methoxy-4-phenoxyphenyl)acetic acid, M.P., 105–107° C., pK′a=7.4.

Analysis.—Calc. for $C_{15}H_{14}O_4$ (percent): C, 69.75; H, 5.46. Found (percent): C, 69.83; H, 5.60.

EXAMPLE 9

Preparation of 2-(3-hydroxy-4-phenoxyphenyl)acetic acid

To 105 ml. of 48 percent hydrobromic acid in 175 ml. of glacial acetic acid were added 17.5 g. of 2-(3-methoxy-4-phenoxyphenyl)acetic acid prepared according to Example 1. The reaction mixture was stirred and refluxed under nitrogen for 18 hours, and poured into about 3 liters of ice water. The reaction was extracted twice with ethyl ether, the extracts washed twice with water, and then extracted with 5 percent sodium hydroxide. The basic solution was washed with ethyl ether, warmed with carbon, filtered, cooled and acidified while stirring by the dropwise addition of 6 N HCl to yield 13.6 g. of crude crystalline 2-(3-hydroxy-4-phenoxyphenyl)acetic acid, M.P. 118–120° C. The crystalline product was taken up in boiling ethyl acetate and hexane and the solution was allowed to cool to room temperature to yield 8.6 g. of 2-(3-hydroxy-4-phenoxyphenyl)acetic acid needles, M.P., 118–120° C., B.P./mm. 194–204/0.08, pK′a=6.8.

Analysis.—Calc. for $C_{14}H_{12}O_4$ (percent): C, 68.84; H, 4.99. Found (percent): C, 68.99; H, 4.92.

Preparation of 2-(3-methyl-4-phenoxyphenyl) propionic acid

To 500 ml. of liquid ammonia containing a trace of ferric chloride were added portionwise 2.48 g. of sodium metal. The resulting solution was stirred for 30 minutes, after which time 11.8 g. of 2-(2-methyl-4-phenoxyphenyl) acetic acid was added over a 30-minute period and the dark green solution was stirred for 45 minutes. To the solution was added dropwise 11.3 g. of methyl iodide. The reaction mixture was stirred for 2.5 hours, and then 500 ml. of dry ethyl ether were added and the reaction mixture was stirred overnight and the ammonia allowed to evaporate. The solution was acidified with dilute hydrochloric acid, ethyl ether was separated, and extracted with 10 percent sodium hydroxide. This was washed with ethyl ether, acidified, and extracted with ethyl ether. The ethyl ether was dried over sodium sulfate and evaporated. The resulting oil was distilled to yield 5 g. of 2-(2-methyl-4-phenoxyphenyl)propionic acid as a yellow, fluorescent oil, B.P. 185–188° C./0.08 mm., pK′a=7.40.

Analysis.—Calc. for $C_{16}H_{16}O_3$ (percent): C, 74.98; H, 6.29. Found (percent): C, 74.73; H, 6.41.

EXAMPLES 10–15

The following α-alkylated compounds were prepared by the method of Example 9, from the corresponding phenoxyphenylacetic acid (or substituted phenoxyphenylacetic acid) and the corresponding alkyl halide.

2-(2-methyl-4-phenoxyphenyl)propionic acid, M.P., 123.5–125° C., pK′a=7.3.

*Analysis.*—Calc. for $C_{16}H_{16}O_3$ (percent): C, 74.98; H, 6.29. Found (percent): C, 74.88; H, 6.31.

2-(4-phenoxyphenyl)butyric acid from 2-(4-phenoxyphenyl)acetic acid and n-propyl iodide, M.P., 73–75° C., pK′a=7.45.

*Analysis.*—Calc. for $C_{17}H_{18}O_3$ (percent): C, 75.73; H, 6.71. Found (percent): C, 75.92; H, 6.98.

2-(2,3-dimethyl-4-phenoxyphenyl)propionic acid, M.P., 100–101° C.

*Analysis.*—Calcd. for $C_{16}H_{16}O_3$ (percent): C, 74.98; H, 6.29. Found (percent): C, 74.88; H, 6.31.

2-(2-fluoro-4-phenoxyphenyl)propionic acid, M.P., 92–94° C.

*Analysis.*—Calc. for $C_{15}H_{13}FO_3$ (percent): C, 69.22; H, 5.03. Found (percent): C, 68.94; H, 5.28.

2-(3-methoxy - 4 - phenoxyphenyl)propionic acid, B.P., 242–250° C./0.08 mm.

*Analysis.*—Calc. for $C_{16}H_{16}O_4$ (percent): C, 70.57; H, 5.92. Found (percent): C, 69.92; H, 6.13.

2-cyclohexyl-2-(4-phenoxyphenyl)acetic acid, M.P., 146–149° C., pK′a=6.9.

*Analysis.*—Calc. for $C_{20}H_{22}O_3$ (percent): C, 77.39; H, 7.14; O, 15.47. Found (percent): C, 77.52; H, 6.96; O, 15.55.

EXAMPLE 16

The following compounds are prepared from the corresponding phenylthioacetophenone following the procedure set forth in Example 1.

2-(2-methyl-4-phenylthiophenyl)acetic acid.
2-(3,5-dimethyl-4-phenylthiophenyl)acetic acid.
2-(3-methoxy-4-phenylthiophenyl)acetic acid
2-(3-ethyl-4-phenylthiophenyl)acetic acid
2-(2-phenoxy-4-phenylthiophenyl)acetic acid
2-(2-methoxy-4-phenylthiophenyl)acetic acid
2-(2-chloro-4-phenylthiophenyl)acetic acid
2-(2-fluoro-4-phenylthiophenyl)acetic aicd

EXAMPLE 17

2-(3-hydroxy - 4 - phenylthiophenyl)acetic acid is prepared according to the method of Example 8 from 2-(3-methoxy-4-phenylthiophenyl)acetic acid.

EXAMPLE 18

The following α-alkyl compounds are prepared by the method of Example 9.

2-(2-methyl-4-phenylthiophenyl)propionic acid
2-(3-methyl-4-phenylthiophenyl)propionic acid
2-(4-phenylthiophenyl)butyric acid
2-(2,3-dimethyl-4-phenylthiophenyl)propionic acid
2-(2-fluoro-4-phenylthiophenyl)propionic acid
2-(3-methoxy-4-phenylthiophenyl)propionic acid
2-cyclohexyl-2-(4-phenylthiophenyl)acetic acid

EXAMPLE 19

The present invention includes within its scope pharmaceutical compositions comprising as an active ingredient, at least one of the compounds of this invention, or pharmaceutically acceptable salts thereof, in association with a pharmaceutical carrier or coating. This invention particularly includes such preparations made up for oral, parenteral or rectal administration, or topical application, e.g., ointments or creams.

Solid compositions for oral administration include tablets, pills, powders, and granules. In such solid compositions, the active compound is admixed with at least one inert diluent, such as sucrose, lactose, or starch. The compositions may also comprise, as in normal practice, additional substances other than inert diluents, e.g., lubricating agents such as magnesium stearate: Liquid compositions for oral administration include pharmaceutically acceptable emulsions, solutions, suspensions, syrups, and elixirs containing inert diluents commonly used in the art, such as water and liquid paraffin. Besides inert diluents, such compositions may also include adjuvants, such as wetting agents, emulsifying and suspending agents, and sweetening, flavoring, and perfuming agents. The compositions according to the present invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of nonaqueous solvents or vehicles are propylene glycol, polyethylene glycol, vegetable oils, such as olive oil, and injectable organic esters such as ethyl oleate. Those compositions may also contain adjuvants, such as preserving, wetting, emulsifying and dispersing agents. They may be sterilized by, for example, filtration through a bacteria-retaining filter, by incorporation in the compositions of sterilizating agents, by irradiation or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suppository wax.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. The dosages are generally between .2 and 50 mg./kg. of animal weight.

The following examples illustrate pharmaceutical compositions according to this invention.

EXAMPLE 20

Tablets weighing 500 mg. and having the following composition are prepared:

|  | Mg. |
|---|---|
| 2-(3,5 - dichloro - 4 - phenoxyphenyl)acetic acid, sodium salt | 250 |
| Starch | 190 |
| Colloidal silica | 50 |
| Magnesium stearate | 10 |

EXAMPLE 21

Tablets weighing 200 mg. and having the following compositions are prepared:

|  | Mg. |
|---|---|
| 2-(3-methyl-4-phenoxyphenyl)propionic acid | 50 |
| Starch | 120 |
| Colloidal silica | 27 |
| Magnesium stearate | 3 |

Tablets analogous to those described in Examples 20 and 21 can be prepared by replacing the above active ingredients by the same weight of any other compound within the scope of this invention.

I claim:

1. A compound having the formula

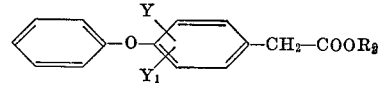

wherein Y is methyl, ethyl, methoxy or halo; $Y_1$ is hydrogen, methyl, ethyl, or halo; $R_2$ is hydrogen, $C_1$ to $C_5$-alkyl, di($C_1$ to $C_3$-alkyl)amino($C_1$ to $C_4$)alkyl, or a pharmaceutically acceptable cationic salt group.

2. A compound in accord with claim 1, said compound being 2-(3-methyl-4-phenoxyphenyl)acetic acid or a pharmaceutically acceptable salt with sodium or calcium.

3. A compound in accord with claim 1, said compound being 2-(3-methoxy-4-phenoxyphenyl)acetic acid or a pharmaceutically acceptable salt with sodium or calcium.

4. A compound in accord with claim 1, said compound being 2-(3,5-dichloro-4-phenoxyphenyl)acetic acid or a pharmaceutically acceptable salt with sodium or calcium.

5. A compound in accord with claim 1, said compound being 2-(3,5-dimethyl-4-phenoxyphenyl)acetic acid or a pharmaceutically acceptable salt thereof with sodium or calcium.

References Cited
UNITED STATES PATENTS 3,361,789   1/1968   Blank   260—471
3,385,886   5/1968   Nicholson   260—515

LORRAINE A. WEINBERGER, Primary Examiner

E. J. GLEIMAN, Assistant Examiner

U.S. Cl. X.R.

260—308 D, 470, 471 R, 472, 473 R, 482 C, 488 CD, 490, 501.1, 516, 519, 558 S, 559 D, 609 R, 613 R; 424—269, 308, 309, 316, 317, 320, 337, 340